US012781618B2

(12) United States Patent
Sakiyama et al.

(10) Patent No.: US 12,781,618 B2
(45) Date of Patent: Nov. 3, 2026

(54) LWD SONIC EVALUATION OF FORMATION HETEROGENEITY

(71) Applicant: Schlumberger Technology Corporation, Sugar Land, TX (US)

(72) Inventors: Naoki Sakiyama, Katy, TX (US); Kong Hauw Sarwa Bakti Tan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 375 days.

(21) Appl. No.: 18/427,940

(22) Filed: Jan. 31, 2024

(65) Prior Publication Data

US 2025/0243751 A1 Jul. 31, 2025

(51) Int. Cl.

| | |
|---|---|
| ***E21B 47/085*** | (2012.01) |
| ***E21B 47/16*** | (2006.01) |
| ***G01V 1/46*** | (2006.01) |
| ***G01V 1/50*** | (2006.01) |

(52) U.S. Cl.

CPC ............ *E21B 47/085* (2020.05); *E21B 47/16* (2013.01); *G01V 1/46* (2013.01); *G01V 1/50* (2013.01); *G01V 2200/16* (2013.01); *G01V 2210/1216* (2013.01); *G01V 2210/169* (2013.01); *G01V 2210/582* (2013.01); *G01V 2210/626* (2013.01)

(58) Field of Classification Search

CPC ...... G01V 1/46; G01V 1/50; G01V 2210/169; G01V 2210/582; G01V 2210/626; G01V 2210/1216; G01V 2210/6222; G01V 2200/16; E21B 47/16; E21B 47/085

USPC ............................................................ 702/11

See application file for complete search history.

(56) References Cited

U.S. PATENT DOCUMENTS

| | | | | |
|---|---|---|---|---|
| 10,288,753 | B2 | 5/2019 | Poole | |
| 10,775,522 | B2 | 9/2020 | Halliday | |
| 11,353,615 | B2 | 6/2022 | Assous | |
| 2023/0304398 | A1 * | 9/2023 | Yajima | E21B 49/006 |

* cited by examiner

*Primary Examiner* — John H Le

(74) *Attorney, Agent, or Firm* — Jeffrey D. Frantz

(57) ABSTRACT

A method for acoustic logging a wellbore includes making sonic logging measurements while rotating a logging while drilling tool in a wellbore, the sonic logging measurements including low frequency measurements and high frequency measurements; estimating a low frequency slowness of the subterranean formation from the low frequency measurements; estimating a high frequency slowness of the subterranean formation from the high frequency measurements; and classifying the subterranean formation as homogeneous when a difference between the low frequency slowness and the high frequency slowness is less than a threshold and heterogeneous when the difference is greater than the threshold.

17 Claims, 3 Drawing Sheets

LWD SONIC EVALUATION OF FORMATION HETEROGENEITY

CROSS REFERENCE TO RELATED APPLICATIONS

None.

BACKGROUND

Acoustic (sonic) logging measurements are well-known and commonly utilized in downhole logging applications, such as in logging while drilling (LWD) and wireline logging (WL) applications. Acoustic logging measurements may be utilized, for example, to determine the slowness (inverse velocity) of sonic energy through a formation, which, along with other logging measurements may be used to estimate the porosity of the formation. Acoustic logs may also be used, for example, to identify formation lithology and source rock as well as to identify other borehole features such as fractures and compaction.

One difficulty with interpreting acoustic logging measurements is distinguishing between formation heterogeneity (such as the presence of a formation or bed boundary) and intrinsic anisotropy (such as caused by fine layering withing a formation). There is a need in industry to identify formation heterogeneities using acoustic logging measurements.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Methods and systems for making acoustic LWD measurements are disclosed. In one example embodiment, a method for acoustic logging a wellbore includes rotating a logging tool in a wellbore penetrating a subterranean formation, the logging tool including an acoustic transmitter and an acoustic receiver; making sonic logging measurements while rotating the logging tool in the wellbore, the sonic logging measurements including low frequency measurements and high frequency measurements; estimating a low frequency slowness of the subterranean formation from the low frequency measurements; estimating a high frequency slowness of the subterranean formation from the high frequency measurements; and classifying the subterranean formation as homogeneous when a difference between the low frequency slowness and the high frequency slowness is less than a threshold and heterogeneous when the difference is greater than the threshold.

Figure 1:
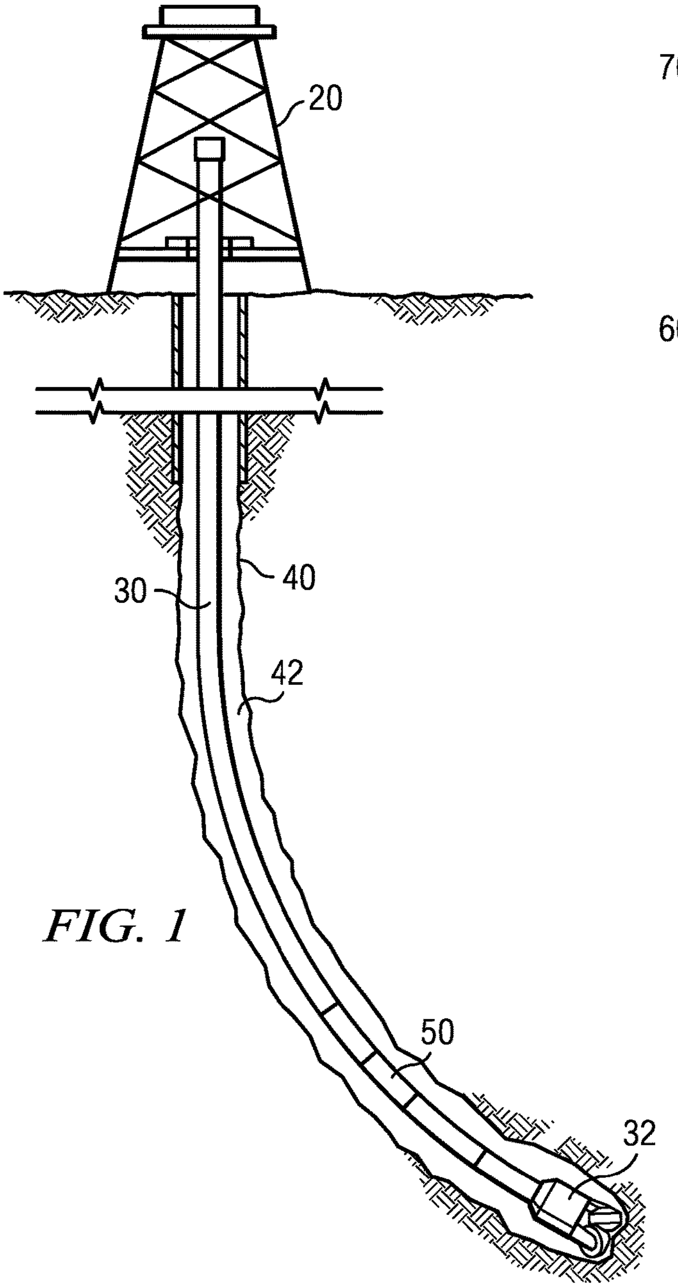
FIG. 1 depicts an example drilling rig including a disclosed directional sonic logging tool.

FIG. 1 depicts an example drilling rig 20 including a disclosed directional sonic (acoustic) logging tool 50. The drilling rig 20 may be positioned over a subterranean formation (not shown) and may be configured for drilling a geothermal well or a hydrocarbon exploration and/or production well. The rig 20 may include, for example, a derrick and a hoisting apparatus (also not shown) for raising and lowering a drill string 30, which, as shown, extends into wellbore 40 and includes a bottom hole assembly that may further include, for example, a drill bit 32, a steering tool (such as a rotary steerable tool), and other logging while drilling (LWD) tools and measurement while drilling (MWD) tools. It will be appreciated that the disclosed embodiments are not limited to any particular drill string or BHA configuration.

A wellbore 40 may be formed in and thereby penetrate subsurface formations by rotary drilling or slide drilling in a manner that is well-known to those or ordinary skill in the art (e.g., via well-known directional drilling techniques). For example, the drill string 30 may be rotated at the surface and/or via a downhole deployed mud motor to drill the well. A pump may deliver drilling fluid to the interior of the drill string 30 thereby causing the drilling fluid to flow downwardly through the drill string 30. The drilling fluid exits the drill string 30, e.g., via ports in the drill bit 32, and then circulates upwardly through the annulus 42 between the outside of the drill string 30 and the wall of the wellbore 40. In this known manner, the drilling fluid lubricates the drill bit 32 and carries formation cuttings uphole to the surface. LWD measurements, such as sonic LWD measurements, are commonly made while drilling and may be used to evaluate properties of the subterranean formation.

It will be understood that the disclosed embodiments are not limited to use with an on-shore rig 20 as illustrated on FIG. 1. The disclosed embodiments are equally well suited for use with either onshore or offshore subterranean operations. The disclosed embodiments may also be used with wireline logging operations.

Figure 2:
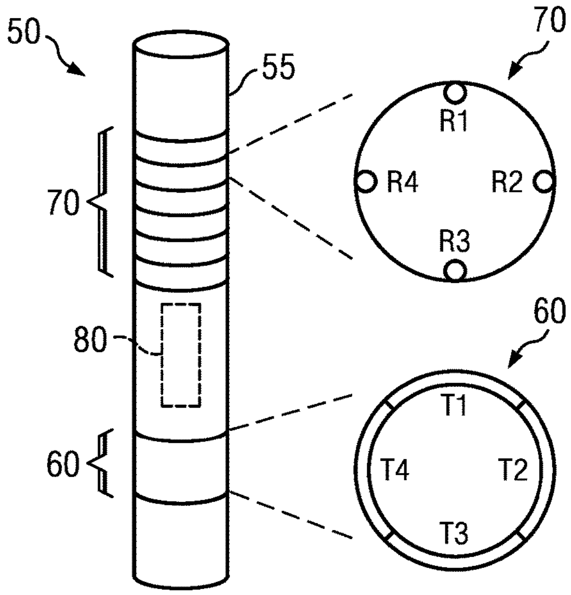
FIG. 2 depicts a portion of one example embodiment of the directional sonic logging tool shown on FIG. 1.

Turning now to FIG. 2, one example embodiment of directional sonic logging tool 50 is depicted. In the depicted example, the tool 50 includes an acoustic transmitter 60 and an acoustic receiver 70 axially spaced apart from one another on a tool collar 55. The tool collar 55 and any optional internal mandrel or external stabilizer blades may be referred to collectively herein as a tool body. The acoustic transmitter 60 may include a multipole transmitter including a plurality (e.g., four or six) azimuthally (circumferentially) spaced transmitter (transducer) elements T1, T2, T3, T4. The acoustic receiver 70 may include a directional receiver further including a plurality of azimuthally spaced receiver arrays R1, R2, R3, R4, in which each receiver array includes a plurality of axially spaced receiver (transducer) elements (e.g., 8 or 12 axially spaced transducers per array). The multipole transmitter and the directional receiver may be configured to transmit and receive acoustic signals with different azimuthal harmonics. For example, monopole, dipole, quadrupole, and unipole wavefields may be transmitted and received by the directional sonic logging tool 50.

In certain advantageous embodiments, the transmitter 60 may be configured to transmit a broadband acoustic waveform into the wellbore. By broadband acoustic waveform it may be meant that the transmitted waveform has a widespread frequency. Stated another way a broadband acoustic waveform includes frequency components over a wide range of acoustic frequencies. In example embodiments, the transmitter may be configured to transmit a waveform having frequency components ranging from 1 kHz to 20 kHz (e.g., from 1 kHz to 16 kHz or from 2 kHz to 16 kHz). In other embodiments, the transmitter may be configured to transmit a multimode acoustic waveform including a first low frequency mode and a second high frequency mode (e.g., in which the low frequency mode has frequency components in a range from 1 kHz to 6 kHz and the high frequency mode has frequency components in a range from 7 kHz to 16 kHz). In other embodiments the transmitter may be configured to transmit first and second narrow band acoustic waveforms (e.g., to sequentially transmit the first and second narrow band waveforms). By narrow band acoustic waveform it may be meant that the waveform includes frequency components over a narrow range of frequencies. In example embodiments, the transmitter may be configured to transmit a first waveform having frequency components ranging from 1 kHz to 6 kHz and a second waveform having frequency components ranging from 7 kHz to 16 kHz.

While the disclosed embodiments are not limited in this regard, the transmitter may be advantageously configured to transmit a dipole waveform. The multipole transmitter depicted on FIG. 2 may transmit a dipole waveform, for example, as follows:

$$\text{Dipole1} = T1 + T2 - T3 - T4$$

$$\text{Dipole2} = T1 - T2 - T3 + T4$$

$$\text{Dipole3} = T1 - T3$$

$$\text{Dipole4} = T2 - T4$$

The directional receiver 70 may also be advantageously configured to receive a dipole waveform. Example dipole waveform reception may include, for example:

$$\text{Dipole1} = R1 + R2 - R3 - R4$$

$$\text{Dipole2} = R1 - R2 - R3 + R4$$

$$\text{Dipole3} = R1 - R3$$

$$\text{Dipole4} = R2 - R4$$

With continued reference to FIG. 2, acoustic logging tool 50 may further include an electronic controller 80 configured to cause the tool 50 to make sonic LWD measurements (e.g., dipole measurements) while the tool 50 rotates in a wellbore (e.g., wellbore 40 in FIG. 1). The controller 80 may be configured to cause the transmitter 60 to transmit an acoustic waveform, such as a dipole waveform, into the wellbore. The controller 80 may be further configured to cause the receiver 70 to receive the transmitted waveform. The controller 80 may be optionally still further configured to evaluate the received waveforms to classify the subterranean formation as homogeneous or heterogeneous (e.g., to identify a formation boundary within sensory range of the sonic logging tool). To perform these functions, the controller may include hardware such as one or more processors (e.g., microprocessors) which may be connected to one or more data storage devices (e.g., hard drives or solid state memory). It will be further understood that the controller may further include processor executable instructions stored in the data storage device. The executable instructions may be configured, for example, to make and process sonic logging measurements as described herein. It will, of course, be understood that the disclosed embodiments are not limited to the use of or the configuration of any particular computer hardware and/or software.

It will be understood that while not depicted, acoustic logging tool 50 may further include one or more toolface (azimuth) sensors, for example, including an accelerometer set, a magnetometer set, or a gyroscopic sensor set. A toolface sensor may be configured to measure the toolface angle of the multipole transmitter 60 and the directional receiver 70 while rotating and to pair the acoustic sensor measurements with a corresponding toolface angle (e.g., via time stamping the measurements). These measurements may then be processed as described in more detail below to construct azimuthal (directional) sonic logging measurements. It will be appreciated that the toolface sensor(s) may also be deployed elsewhere in the drill string, for example, in an MWD tool or a rotary steerable tool and that the sonic logging tool 50 may be in electronic communication with such remote toolface sensor(s).

Figure 3:
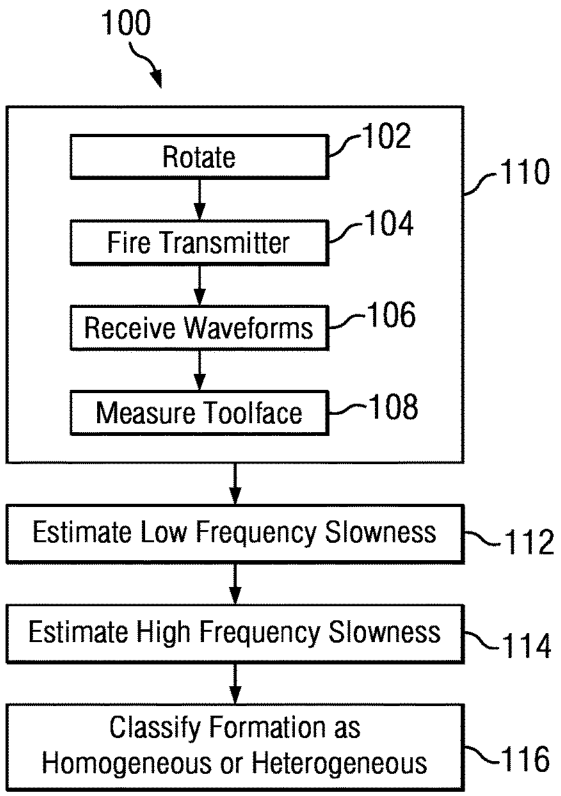
FIG. 3 depicts a flowchart of one example method for evaluating a subterranean formation.

Turning now to FIG. 3, a flowchart of one example method 100 for evaluating a subterranean formation is depicted. A plurality of sonic logging measurements may be made in a wellbore at 110. The sonic logging measurements include first low frequency measurements and second high frequency measurements. Making the measurements may include rotating a sonic logging tool (such as tool 50) in a wellbore (e.g., as depicted on FIG. 1) at 102. For example, a transmitter (such as multipole transmitter 60) may be fired while the tool rotates at 104 to generate acoustic waves (such as dipole acoustic waves) in the borehole (wellbore) and surrounding formation. The transmitted waves may include a broadband waveform or a multimode waveform including both the low frequency and the high frequency or first and second sequential waveforms including a first low frequency waveform and a second high frequency waveform. The transmitted dipole waves may be received by an acoustic receiver (such as directional receiver 70) at 106. Toolface measurements may be made at 108 to determine the rotational orientation of the sonic logging tool in the wellbore while rotating, firing, and receiving.

The low frequency sonic logging measurements may be evaluated at 112 to estimate a low frequency slowness of the formation and the high frequency sonic logging measurements may be evaluated at 114 to estimate a high frequency slowness of the formation. It will be appreciated that the low and high frequency sonic logging measurements may be evaluated using either dispersive or non-dispersive processing techniques, such as Dispersive Slowness Time Coherence (DSTC) or Non-Dispersive Slowness Time Coherence (NDSTC or simply STC). The formation may be classified at 116 as homogenous or heterogenous based on a difference between the low frequency slowness and the high frequency slowness. For example, the formation may be classified as homogeneous at 116 when a difference between the high and low frequency slowness estimates is less than a threshold and may be classified as heterogeneous when the difference between the high and low frequency slowness estimates is greater than the threshold.

With continued reference to FIG. 3, it will be appreciated that the classification at 116 may alternatively include comparing the difference between the high and low frequency slowness estimates with first and second thresholds (in which the first threshold is less than the second threshold). The formation may be classified as homogeneous when the difference is less than the first threshold and may be classified as heterogeneous when the difference is greater than the second threshold. The classification may be uncertain when the difference is between the first and second thresholds (e.g., greater than the first threshold and less than the second threshold). As described in more detail below, in some operations an uncertain classification may indicate that the formation boundary is close to the borehole, but not so close as to give a clear indication of heterogeneity.

Figure 4:
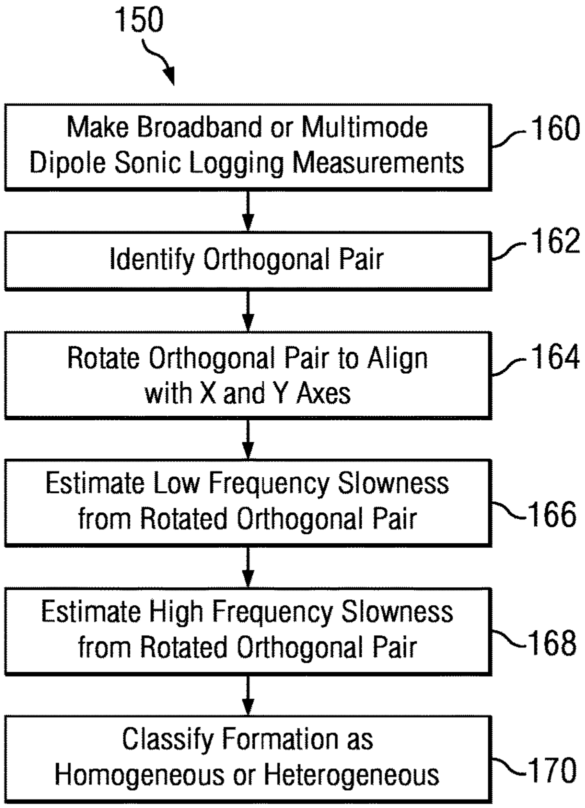
FIG. 4 depicts a flow chart of another example method for evaluating a subterranean formation.

Turning now to FIG. 4 a flow chart of another example method 150 for evaluating a subterranean formation is depicted. A plurality of broadband or multimode dipole sonic logging measurements may be made at 160, for example, as described above with respect to FIG. 3. Briefly, the sonic logging tool is rotated in a wellbore while dipole waveforms are transmitted into the wellbore and corresponding waveforms are received by an acoustic receiver. These measurements may be made in sets corresponding to a predetermined time interval or depth interval in the wellbore. An orthogonal pair of measurements may be identified at 162, for example, based on the corresponding toolface angles of the dipole transmitter firings. The identified orthogonal pair may be mathematically rotated to align with orthogonal axes (e.g., predefined or computed X and Y orthogonal axes) at 164. A low frequency portion of the orthogonal pair may be evaluated at 166 to estimate a low frequency slowness of the formation and a high frequency portion of the orthogonal pair may be evaluated at 168 to estimate a high frequency slowness of the formation. The high and low frequency slowness estimates may be compared and the formation classified at 170 as homogeneous or heterogeneous (e.g., as homogenous when a difference between the high and low frequency slowness estimates is less than a threshold and heterogeneous when the difference between the high and low frequency slowness estimates is greater than a threshold).

Identifying the orthogonal pair of measurements at 162 may include evaluating the rotational orientation (toolface angle) corresponding to each of the transmitter dipole firings used to make the sonic dipole logging measurements at 160. The rotational orientations (toolface angles) may then be evaluated to identify the orthogonal pairs. By orthogonal pairs it is meant pairs of measurements for which the transmitter firings have corresponding rotational orientations that are orthogonal or near orthogonal to one another. The term orthogonal pairs may also refer to the corresponding received waveforms at the receiver array that are aligned with each of the orthogonal transmitter firings. These waveforms or measurements may further be referred to as XX and YY measurements (or an XX and YY orthogonal pair). It will, of course, be understood that by orthogonal it is meant that the rotational orientations have a difference of 90 degrees (e.g., within an acceptable orthogonality error such as 5 or 10 degrees).

Figure 5:
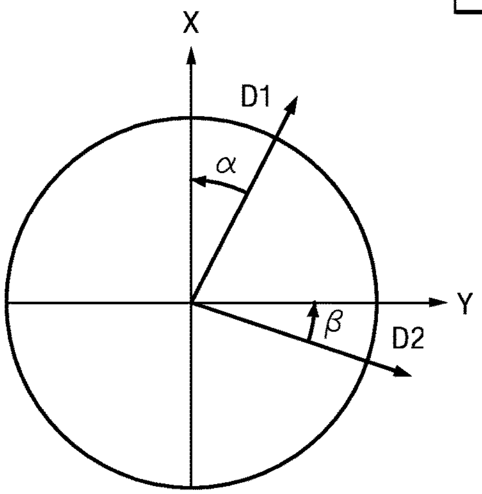
FIG. 5 depicts a schematic cross section illustrating example X and Y axes and an example orthogonal pair given by dipole measurements D1 and D2.

FIG. 5 depicts a schematic cross section illustrating example X and Y axes and an example orthogonal pair identified at 162 of FIG. 4 given by dipole measurements D1 and D2. In this example illustration, α represents the angle between the D1 dipole measurement and the X axis and β represents the angle between the D2 dipole measurement and the Y axis. When α=β the identified orthogonal pair has perfect orthogonality (i.e., the angle between D1 and D2 is equal to 90 degrees). When α≠β the orthogonality error is equal to α−β. Measurement pairs having and orthogonality error less than some criterial (e.g., 5 or 10 degrees) may be identified as being and orthogonal pair.

With continued reference to FIGS. 4 and 5, rotating the orthogonal pair at 164 may include compiling a corresponding 4C component waveform and mathematically rotating the 4C component waveform to be coincident with previously defined X and Y axes. The 4C component waveforms may be rotated, for example, as follows:

$$\begin{bmatrix} XX_\alpha & YX_\alpha \\ XY_\alpha & YY_\alpha \end{bmatrix} = R(\alpha)\begin{bmatrix} XX & YX \\ XY & YY \end{bmatrix}R^T(\alpha) \quad (1)$$

where $$\begin{bmatrix} XX & YX \\ XY & YY \end{bmatrix}$$

represents the as compiled 4C component waveforms, $$\begin{bmatrix} XX_\alpha & YX_\alpha \\ XY_\alpha & YY_\alpha \end{bmatrix}$$

represents the rotated waveforms, $$R(\alpha) = \begin{bmatrix} \cos(\alpha) & \sin(\alpha) \\ -\sin(\alpha) & \cos(\alpha) \end{bmatrix},$$

and α represents the angle between the X transmitter firing and the X axis. It will be appreciated that Eq. (1) assumes that the orthogonal pair has perfect orthogonality (i.e., such that α=β in FIG. 5). This assumption may be valid, for example, when the orthogonality error is less than about 1 or 2 degrees. For LWD applications, for which the orthogonal pairs are generally only approximately orthogonal (e.g., when the orthogonality error is up to 5 or 10 degrees or more), Eq. (1) may be modified, for example, as follows:

$$\begin{bmatrix} XX_{\alpha\beta} & YX_{\alpha\beta} \\ XY_{\alpha\beta} & YY_{\alpha\beta} \end{bmatrix} = R(\alpha)\begin{bmatrix} XX & YX + (YY - XX)\tan(\alpha - \beta) \\ XY & YY - (XY + YX)\tan(\alpha - \beta) \end{bmatrix}R^T(\alpha) \quad (2)$$

where $$\begin{bmatrix} XX & YX \\ XY & YY \end{bmatrix}$$

again represents the as compiled 4C component waveforms, $$\begin{bmatrix} XX_{\alpha\beta} & YX_{\alpha\beta} \\ XY_{\alpha\beta} & YY_{\alpha\beta} \end{bmatrix}$$

represents the rotated waveforms, α represents the angle between the X transmitter firing and the X axis, and β represents the angle between the Y transmitter firing and the Y axis. It will be appreciated that Eq. (2) first corrects for the orthogonality error (α−β) and then rotates the corrected waveforms by the angle α. Note that the YX component of the original 4C component waveforms is corrected by the term +(YY−XX) tan (α−β) and that the original YY component is corrected by the term −(XY+YX) tan (α−β).

Eq. (2) advantageously includes only linear combinations of the original 4C waveforms and may be computed quickly using a downhole processor (e.g., via controller 80 in FIG. 2). Moreover, Eq. (2) has been described with respect to rotating waveforms to align with mutually orthogonal X and Y directions. However, Eq. (2) may also be used rotate waveforms towards any non-orthogonal X and Y axes. It will be appreciated that by 4C component waveforms it is meant the XX and YY orthogonal pair (the coupling or inline components) and the XY and YX cross components, where the first symbol (X or Y) represents the transmitter orientation and the second symbol (X or Y) represents the receiver orientation with respect to the X and Y axes. It will be further appreciated that the XX measurement may be made with a dipole that is substantially aligned with the formation boundary and that the YY measurements may be made with a dipole that is substantially orthogonal to the formation boundary.

With continued reference to FIG. 4, the evaluation at 168 may further include evaluating the rotated orthogonal pair to estimate low frequency XX and YY slowness values and high frequency XX and YY slowness values. The comparison and classification at 170 may further include comparing the low frequency XX slowness value and the high frequency XX slowness value and comparing the low frequency YY slowness value and the high frequency YY slowness value. The formation may be classified as heterogeneous when the difference between the low frequency YY slowness value and the high frequency YY slowness value exceeds a threshold. The formation may also be classified as heterogeneous when the differences between the low frequency YY slowness value and the high frequency YY slowness value and the low frequency XX slowness value and the high frequency XX slowness value both exceed the threshold. The formation may be classified as homogeneous when the differences between the low frequency YY slowness value and the high frequency YY slowness value and the low frequency XX slowness value and the high frequency XX slowness value are both less than the threshold. In some embodiments, the classification may be uncertain when the difference between the low frequency YY slowness value and the high frequency YY slowness value exceeds the threshold and the difference between the low frequency XX slowness value and the high frequency XX slowness value is less than the threshold.

Figure 6A:
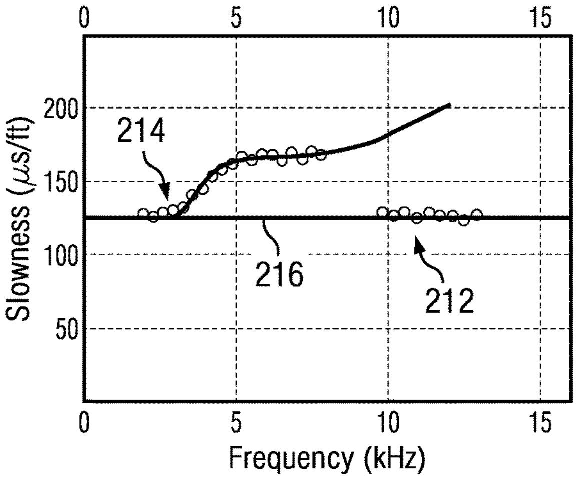
FIGS. 6A and 6B (collectively FIG. 6) depict example plots of slowness versus frequency (dispersion curves) for a first homogeneous formation (6A) and a second heterogeneous formation (6B).
Figure 6B:
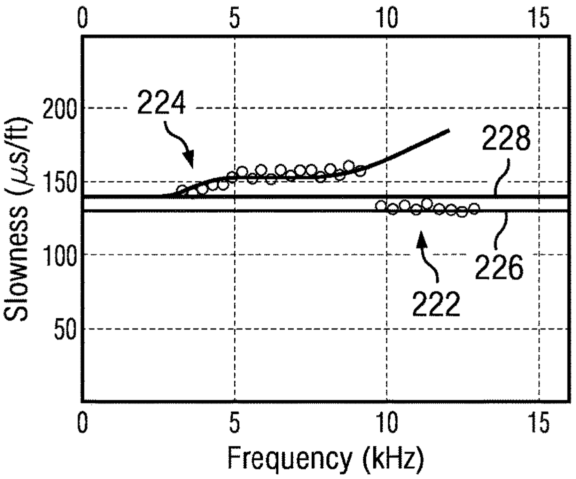

Turning now to FIGS. 6A and 6B (collective FIG. 6), example plots of slowness versus frequency (dispersion curves) are depicted for a first homogeneous formation (6A) and a second heterogeneous formation (6B). In the example shown in FIG. 6A, the high frequency sonic logging measurements were evaluated (as indicated at 212) using non-dispersive processing (STC) to estimate the high frequency shear slowness estimate. As indicated, the high frequency shear slowness estimate may represent a majority of the acoustic energy over a range of high frequency acoustic measurements (e.g., in a range from about 9-14 kHz or 10-12 kHz in the depicted example). The low frequency sonic logging measurements were be evaluated (as indicated at 214) using dispersive processing (DSTC) to estimate the low frequency shear slowness estimate. As indicated, the low frequency shear slowness estimate may be taken as the slowness value at the low frequency limit or as extrapolated to the low frequency limit (e.g., in a range from about 2-3 kHz in the depicted example). Alternatively, the low frequency shear slowness estimate may be taken from curve fitting technique using a mathematical or physics-based model. Note that in the example depicted on FIG. 6A, the high frequency slowness estimate is approximately equal to the low frequency slowness estimate (about equal to 125 μs/ft as shown at 216). Since the difference between the high frequency slowness estimate and the low frequency slowness estimate is less than a threshold, the formation may be classified as being homogeneous.

In the example shown in FIG. 6B, the high frequency sonic logging measurements were be evaluated (as indicated at 222) using STC to estimate the high frequency shear slowness. As described above and as indicated at 222, the high frequency shear slowness estimate may be represented by acoustic energy over a range of high frequency acoustic measurements (e.g., from 9 kHz to 15 kHz or from 10 kHz to 14 kHz). The low frequency sonic logging measurements were evaluated (as indicated at 224 using DSTC to estimate the low frequency shear slowness. As described above and as indicated at 224, the low frequency shear slowness estimate may be taken as the slowness value at or approaching the low frequency limit. Note that in the example depicted on FIG. 6B, the high frequency slowness estimate 226 is less than the low frequency slowness estimate 228 (about 130 μs/ft versus about 140 μs/ft). Since the difference between the high frequency slowness estimate 226 and the low frequency slowness 228 estimate exceeds a threshold (an example threshold such as 2 μs/ft, 4 μs/ft, or 6 μs/ft), the formation may be classified as being heterogeneous.

The disclosed embodiments are now described in further detail by the way of the following modeling example. Table 1 lists the modeling parameters used in this example. A heterogeneous formation including first and second (upper and lower) formations was modeled. A four inch diameter sonic logging tool was modeled in a 6 inch diameter horizontal wellbore. The modeled sonic logging tool included a transmitter receiver axial spacing of 7 feet. As listed in Table 1, the first (upper) formation had a modeled density of 2541.2 kg/m$^3$, a modeled compressional slowness of 67.1 μs/ft, and a modeled shear slowness of 125.5 μs/ft. The second (lower) formation had a modeled density of 2503.0 kg/m$^3$, a modeled compressional slowness of 71.3 μs/ft, and a modeled shear slowness of 135.5 μs/ft. The density of the drilling fluid was modeled at 950 kg/m$^3$ and a modeled slowness of 220 μs/ft. The position of the borehole was varied such that the formation boundary (between the first and second formations) was located 0, 2.1, 3, 6, 12, 24, or 36 inches below the center of the borehole. High frequency and low frequency shear slowness values were computed for each formation boundary position for both XX and YY measurements (where the X axis was the horizontal direction and was aligned with the formation boundary and the Y axis was the vertical direction and was perpendicular to the formation boundary). High frequency shear slowness was computed using STC processing with a processing band of 8-16 kHz. Low frequency shear slowness was computed using DSTC processing with a processing band of 2.5-5 kHz with the corresponding tool model assumed in this numerical modeling. No anisotropy was assumed.

TABLE 1

| Model Parameters | |
|---|---|
| Borehole Diameter | 6 inches |
| Tool Diameter | 4 inches |
| Transmitter Receiver Spacing | 84 inches |

TABLE 1-continued

| Model Parameters | |
|---|---|
| Formation 1 Density | 2541.2 kg/m$^3$ |
| Formation 1 Compressional Slowness | 67.1 μs/ft |
| Formation 1 Shear Slowness | 125.5 μs/ft |
| Formation 2 Density | 2503.0 kg/m$^3$ |
| Formation 2 Compressional Slowness | 71.3 μs/ft |
| Formation 2 Shear Slowness | 135.5 μs/ft |
| Drilling Fluid Density | 950 kg/m$^3$ |
| Drilling Fluid Slowness | 220 μs/ft |

Figure 7A:
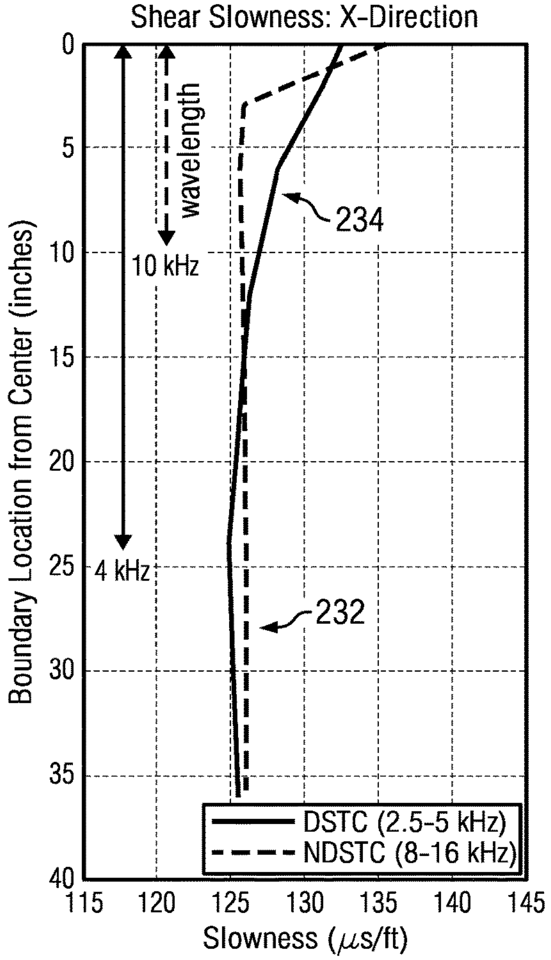
FIGS. 7A and 7B (collectively FIG. 7) depict plots of modeled high and low frequency XX (7A) and YY (7B) shear slowness on the horizontal axis with respect to the boundary location on the vertical axis.
Figure 7B:
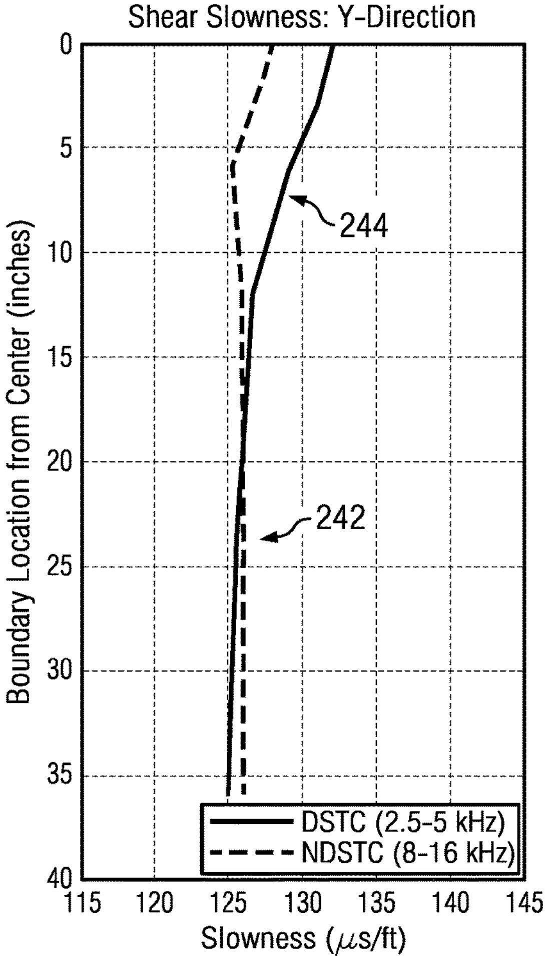

FIGS. 7A and 7B (collectively FIG. 7) depict plots of computed high and low frequency shear slowness on the horizontal axis with respect to the boundary location from the center of the borehole on the vertical axis for the XX measurements (7A) and the YY measurements (7B). The computed high frequency slowness values are plotted as dashed lines and the computed low frequency slowness values are plotted as solid lines. Note that the high frequency and low frequency slowness values are similar (with essentially no or very small difference) when the formation is boundary is a long distance away from the center of the borehole (e.g., greater than about 10 or 15 inches in this example as shown at 232 and 242). It was realized that the formation is essentially homogeneous (within the sensory range of the sonic measurements) when the formation is boundary is a long distance away from the center of the borehole. It was therefore further realized that sonic measurements indicating a small difference (less than a threshold) between high frequency and low frequency slowness values may be indicative of a homogeneous formation.

With continued reference to FIG. 7, note also that there is a marked difference between the high frequency and low frequency slowness values when the formation is boundary is closed to the borehole or is intercepted by the borehole (e.g., less than about 10 or 15 inches in this example as shown at 234 and 244). It was realized that the formation is essentially heterogeneous (within the sensory range of the sonic measurements) when the formation is boundary is close to the center of the borehole or is intercepted by the borehole. It was therefore further realized that sonic measurements indicating a larger difference (greater than a threshold) between high frequency and low frequency slowness values may be indicative of a heterogeneous formation.

It is apparent from the modelling results set for in FIG. 7 that the difference between the high frequency shear slowness and the low frequency shear slowness may be more pronounced for the YY measurements (FIG. 7B) as shown at 244, particularly when the formation boundary intercepts the borehole (at distances of 0, 2.1, and 3 in FIG. 7). As such, in certain example operations, the YY measurements may provide a better indication of formation heterogeneity for the type of horizontal boundary assumed in this example.

While not wishing to be bound by theory it is believed that the slowness difference between the high and low frequency measurements may be caused by different depths of investigation. In particular, the high frequency sonic waveforms have a smaller wavelength and therefore smaller depth of investigation than the low frequency sonic waveforms. The low frequency measurements may be influenced by a remote formation, while the high frequency measurements tend to be more sensitive to the local formation environment. The different depth of investigation may therefore lead to the observed slowness difference when a formation boundary is within the depth of investigation of the low frequency measurement.

With further reference to FIG. 7, it will, of course, be appreciated that the low frequency slowness is not necessarily (or always) greater than the high frequency slowness. On the contrary, the low frequency slowness may be less than the high frequency slowness, for example, when the slowness of the upper formation is greater than that of the lower formation. The disclosed embodiments are not limited to any particular sign (positive or negative) of the difference.

It will be understood that the present disclosure includes numerous embodiments. These embodiments include, but are not limited to, the following embodiments.

In a first embodiment, a method for acoustic logging a wellbore comprises rotating a logging tool in a wellbore penetrating a subterranean formation, the logging tool including an acoustic transmitter and an acoustic receiver; making sonic logging measurements while rotating the logging tool in the wellbore, the sonic logging measurements including low frequency measurements and high frequency measurements; estimating a low frequency slowness of the subterranean formation from the low frequency measurements; estimating a high frequency slowness of the subterranean formation from the high frequency measurements; and classifying the subterranean formation as homogeneous when a difference between the low frequency slowness and the high frequency slowness is less than a threshold and heterogeneous when the difference is greater than the threshold.

A second embodiment may include the first embodiment, further comprising generating a classification log of the subterranean formation.

A third embodiment may include any one of the first through second embodiments, wherein the acoustic transmitter is configured to transmit a broadband acoustic waveform having frequency components ranging from 1 kHz to 16 kHz.

A fourth embodiment may include any one of the first through third embodiments, wherein the low frequency measurements are made at frequencies in a range from 1 kHz to 6 kHz; and the high frequency measurements are made at frequencies in a range from 7 kHz to 16 kHz.

A fifth embodiment may include any one of the first through fourth embodiments, wherein the estimated low frequency slowness is a low frequency shear slowness of the subterranean formation and the estimated high frequency slowness is a high frequency shear slowness of the subterranean formation.

A sixth embodiment may include the fifth embodiment, wherein the estimating the low frequency slowness comprises using dispersive processing to estimate a shear slowness value at a low frequency limit; and the estimating the high frequency slowness comprises using dispersive or non-dispersive processing to estimate a shear slowness value over a range of high frequencies.

A seventh embodiment may include any one of the first through sixth embodiments, wherein the sonic logging measurements comprise dipole sonic logging measurements.

An eighth embodiment may include the seventh embodiment, wherein the making the sonic logging measurements, further comprises: firing the acoustic transmitter a plurality of times while the logging tool rotates in the wellbore to generate a corresponding plurality of dipole waveforms; receiving the plurality of dipole waveforms at a directional receiver including a plurality of circumferentially spaced receiver arrays; and measuring a toolface angle corresponding to each of the plurality of transmitter firings.

A ninth embodiment may include any one of the seventh through eighth embodiments, further comprising: evaluating the sonic logging measurements to identify an orthogonal pair of measurements including a first measurement and a second measurement, wherein a measured toolface angle of the first measurement is orthogonal with a measured toolface angle of the second measurement within a predetermined toolface tolerance; rotating the orthogonal pair of measurements to align with predefined orthogonal axes; and wherein the low frequency slowness and the high frequency slowness are estimated from the rotated orthogonal pair of measurements.

A tenth embodiment may include the ninth embodiment, wherein the low frequency slowness and the high frequency slowness are estimated from the sonic logging measurements made with a dipole that is orthogonal to a formation boundary in the subterranean formation.

In an eleventh embodiment, a system for evaluating a subterranean formation comprises an acoustic logging while drilling tool including an acoustic transmitter and an acoustic receiver deployed in a logging while drilling tool body; and one or more processors configured to: cause the acoustic transmitter and the acoustic receiver to make high frequency sonic logging measurements and low frequency sonic logging measurements while the logging while the drilling tool rotates in a wellbore; estimate a low frequency slowness of the subterranean formation from the low frequency measurements; estimate a high frequency slowness of the subterranean formation from the high frequency measurements; and classify the subterranean formation as homogeneous when a difference between the low frequency slowness and the high frequency slowness is less than a threshold and heterogeneous when the difference is greater than the threshold.

A twelfth embodiment may include the eleventh embodiment, wherein: the acoustic transmitter is configured to transmit a broadband acoustic waveform; the low frequency measurements are made at frequencies in a range from 1 kHz to 6 kHz; and the high frequency measurements are made at frequencies in a range from 7 kHz to 16 kHz.

A thirteenth embodiment may include any one of the eleventh through twelfth embodiments, wherein the one or more processors are configured to estimate the low frequency slowness using dispersive processing to estimate a shear slowness value at a low frequency limit; and the one or more processors are configured to estimate the high frequency slowness using dispersive or non-dispersive processing to estimate a shear slowness value over a range of high frequencies.

A fourteenth embodiment may include any one of the eleventh through thirteenth embodiments, wherein the one or more processors are configured to cause the transmitter to generate a plurality of dipole waveforms while the drilling tool rotates in a wellbore and receive the plurality of dipole waveforms at a directional receiver including a plurality of circumferentially spaced receiver arrays.

A fifteenth embodiment may include the fourteenth embodiment, wherein the one or more processors are further configured to: evaluate the sonic logging measurements to identify an orthogonal pair of measurements including a first measurement and a second measurement, wherein a measured toolface angle of the first measurement is orthogonal with a measured toolface angle of the second measurement within a predetermined toolface tolerance; rotate the orthogonal pair of measurements to align with predefined orthogonal axes; and wherein the low frequency slowness and the high frequency slowness are estimated from the rotated orthogonal pair of measurements.

In a sixteenth embodiment a method for acoustic logging a wellbore comprises rotating a logging tool in a wellbore penetrating a subterranean formation, the logging tool including an acoustic transmitter and an acoustic receiver; making dipole sonic logging measurements while rotating the logging tool in the wellbore; evaluating the sonic logging measurements to identify an orthogonal pair of measurements including a first measurement and a second measurement, wherein a measured toolface angle of the first measurement is orthogonal with a measured toolface angle of the second measurement within a predetermined toolface tolerance; rotating the orthogonal pair of measurements to align with predefined orthogonal axes; estimating a low frequency slowness of the subterranean formation from a low frequency portion of the measurements in the rotated orthogonal pair; estimating a high frequency slowness of the subterranean formation from a high frequency portion of the measurements in the rotated orthogonal pair; and classifying the subterranean formation as homogeneous when a difference between the low frequency slowness and the high frequency slowness is less than a threshold and heterogeneous when the difference is greater than the threshold.

A seventeenth embodiment may include the sixteenth embodiment, wherein the acoustic transmitter is configured to transmit a broadband acoustic waveform having frequency components ranging from 1 kHz to 16 kHz; the low frequency portion of the measurements are at frequencies in a range from 1 kHz to 6 kHz; and the high frequency portion of the measurements are at frequencies in a range from 7 kHz to 16 kHz.

An eighteenth embodiment may include any one of the sixteenth through seventeenth embodiments, wherein the estimating the low frequency slowness comprises using dispersive processing to estimate a shear slowness value at a low frequency limit; and the estimating the high frequency slowness comprises using dispersive or non-dispersive processing to estimate a shear slowness value over a range of high frequencies.

A nineteenth embodiment may include any one of the sixteenth through eighteenth embodiments, wherein the orthogonal pair of measurements comprises an XX measurement for which a transmitted dipole is aligned with a formation boundary in the subterranean formation and a YY measurement for which a transmitted dipole orthogonal with the formation boundary in the subterranean formation; and the classifying further comprises classifying the subterranean formation as homogeneous when a difference between the low frequency slowness and the high frequency slowness of the YY measurement is less than a threshold and heterogeneous when the difference is greater than the threshold.

A twentieth embodiment may include any one of the sixteenth through nineteenth embodiments, wherein the making the dipole sonic logging measurements, further comprises: firing the acoustic transmitter a plurality of times while the logging tool rotates in the wellbore to generate a corresponding plurality of dipole waveforms; receiving the plurality of dipole waveforms at a directional receiver including a plurality of circumferentially spaced receiver arrays; and measuring a toolface angle corresponding to each of the plurality of transmitter firings.

Although LWD sonic evaluation of formation heterogeneity has been described in detail, it should be understood that various changes, substitutions and alternations can be made herein without departing from the spirit and scope of the disclosure as defined by the appended claims.

What is claimed is:

1. A method for acoustic logging, the method comprising:

performing drilling activities;

while performing the drilling activities, rotating a logging tool in a wellbore penetrating a subterranean formation, the logging tool including an acoustic transmitter and an acoustic receiver;

while performing the drilling activities and rotating the logging tool, sequentially transmitting a multi-mode acoustic waveform from the acoustic transmitter, wherein sequentially transmitting the multi-mode acoustic waveform includes:

transmitting a low-frequency mode having low frequency components in a low-frequency range between 1 kHz and 6 kHz; and transmitting a high-frequency mode having high frequency components in a high frequency range between 7 kHz and 16 kHz;

while performing the drilling activities and rotating the logging tool, making sonic logging measurements at the acoustic receiver, the sonic logging measurements including low frequency measurements from the low-frequency mode and high frequency measurements from the high-frequency mode;

estimating a low frequency slowness of the subterranean formation from the low frequency measurements;

estimating a high frequency slowness of the subterranean formation from the high frequency measurements;

classifying the subterranean formation as homogeneous when a difference between the low frequency slowness and the high frequency slowness is less than a threshold and heterogeneous when the difference is greater than the threshold; and responsive to classifying the subterranean formation as heterogenous, identifying a formation boundary within a range of the logging tool.

2. The method of claim 1, further comprising generating a classification log of the subterranean formation.

3. The method of claim 1, wherein the low frequency slowness is a low frequency shear slowness of the subterranean formation and the high frequency slowness is a high frequency shear slowness of the subterranean formation.

4. The method of claim 3, wherein:

estimating the low frequency slowness comprises using dispersive processing to estimate a shear slowness value at a low frequency limit; and estimating the high frequency slowness comprises using dispersive or non-dispersive processing to estimate a shear slowness value over the high frequency range.

5. The method of claim 1, wherein the sonic logging measurements comprise dipole sonic logging measurements.

6. The method of claim 5, wherein sequentially transmitting the multi-mode acoustic waveform further comprises:

firing the acoustic transmitter for a plurality of transmitter firings while the logging tool rotates in the wellbore to generate a corresponding plurality of dipole waveforms;

receiving the plurality of dipole waveforms at a directional receiver including a plurality of circumferentially spaced receiver arrays; and measuring a toolface angle corresponding to each of the plurality of transmitter firings.

7. The method of claim 5, further comprising:

evaluating the sonic logging measurements to identify an orthogonal pair of measurements including a first measurement and a second measurement, wherein a first measured toolface angle of the first measurement is orthogonal with a second measured toolface angle of the second measurement within a predetermined toolface tolerance; and rotating the orthogonal pair of measurements to align with predefined orthogonal axes, resulting in a rotated orthogonal pair of measurements, wherein the low frequency slowness and the high frequency slowness are estimated from the rotated orthogonal pair of measurements.

8. The method of claim 7, wherein the low frequency slowness and the high frequency slowness are estimated from the sonic logging measurements made with a dipole that is orthogonal to the formation boundary in the subterranean formation.

9. The method of claim 1, wherein identifying the formation boundary includes identifying the formation boundary intercepting the wellbore.

10. A system for evaluating a subterranean formation, the system comprising:

an acoustic logging while drilling tool including an acoustic transmitter and an acoustic receiver deployed in a logging while drilling tool body; and one or more processors configured to:

while performing drilling activities and rotating the acoustic logging while drilling tool in a downhole environment, cause the acoustic transmitter to sequentially transmit a multi-mode acoustic waveform from the acoustic transmitter, wherein sequentially transmitting the multi-mode acoustic waveform includes:

transmitting a low-frequency mode having low frequency components in a low-frequency range between 1 kHz and 6 kHz; and transmitting a high-frequency mode having high frequency components in a high frequency range between 7 kHz and 16 kHz;

while performing the drilling activities and rotating the acoustic logging while drilling tool, cause the acoustic receiver to make sonic logging measurements, the sonic logging measurements including high frequency measurements from the high-frequency mode and low frequency measurements from the low-frequency mode;

estimate a low frequency slowness of the subterranean formation from the low frequency measurements;

estimate a high frequency slowness of the subterranean formation from the high frequency measurements;

classify the subterranean formation as homogeneous when a difference between the low frequency slowness and the high frequency slowness is less than a threshold and heterogeneous when the difference is greater than the threshold; and responsive to classifying the subterranean formation as heterogenous, identify a formation boundary within a range of the acoustic logging while drilling tool.

11. The system of claim 10, wherein:

the one or more processors are configured to estimate the low frequency slowness using dispersive processing to estimate a shear slowness value at a low frequency limit; and the one or more processors are configured to estimate the high frequency slowness using dispersive or non-dispersive processing to estimate a shear slowness value over the high frequency range.

12. The system of claim 10, wherein sequentially transmitting the multi-mode acoustic waveform includes a sequentially transmitting a plurality of dipole waveforms, wherein the acoustic receiver includes directional receiver including a plurality of circumferentially spaced receiver arrays, and wherein the one or more processors are configured to receive the plurality of dipole waveforms at the directional receiver including the plurality of circumferentially spaced receiver arrays.

13. The system of claim 12, wherein the one or more processors are further configured to:

evaluate the sonic logging measurements to identify an orthogonal pair of measurements including a first measurement and a second measurement, wherein a measured toolface angle of the first measurement is orthogonal with a measured toolface angle of the second measurement within a predetermined toolface tolerance; and rotate the orthogonal pair of measurements to align with predefined orthogonal axes, resulting in a rotated orthogonal pair, wherein the low frequency slowness and the high frequency slowness are estimated from the rotated orthogonal pair of measurements.

14. A method for acoustic logging a wellbore, the method comprising:

performing drilling activities while rotating a logging tool in a wellbore penetrating a subterranean formation, the logging tool including an acoustic transmitter and an acoustic receiver;

while performing the drilling activities and rotating the logging tool, sequentially transmitting a plurality of dipole waveforms from the acoustic transmitter, the plurality of dipole waveforms including a multi-mode acoustic waveform, wherein sequentially transmitting the multi-mode acoustic waveform includes:

transmitting a low-frequency mode having low frequency components in a low-frequency range between 1 kHz and 6 kHz; and transmitting a high-frequency mode having high frequency components in a high frequency range between 7 kHz and 16 kHz;

while performing the drilling activities and rotating the logging tool, receiving the plurality of dipole waveforms at the acoustic receiver to make dipole sonic logging measurements;

evaluating the dipole sonic logging measurements to identify an orthogonal pair of measurements including a first measurement and a second measurement, wherein a measured toolface angle of the first measurement is orthogonal with a measured toolface angle of the second measurement within a predetermined toolface tolerance;

rotating the orthogonal pair of measurements to align with predefined orthogonal axes, resulting in a rotated orthogonal pair of measurements;

estimating a low frequency slowness of the subterranean formation from a low frequency portion of the measurements in the rotated orthogonal pair of measurements;

estimating a high frequency slowness of the subterranean formation from a high frequency portion of the measurements in the rotated orthogonal pair of measurements;

classifying the subterranean formation as homogeneous when a difference between the low frequency slowness and the high frequency slowness is less than a threshold and heterogeneous when the difference is greater than the threshold; and responsive to classifying the subterranean formation as heterogenous, identifying a formation boundary within a range of the logging tool and interrupting the wellbore.

15. The method of claim 14, wherein:

estimating the low frequency slowness comprises using dispersive processing to estimate a shear slowness value at a low frequency limit; and estimating the high frequency slowness comprises using dispersive or non-dispersive processing to estimate a shear slowness value over the high frequency range.

16. The method of claim 14, wherein:

the orthogonal pair of measurements comprises an XX measurement for which a transmitted dipole is aligned with a formation boundary in the subterranean formation and a YY measurement for which a transmitted dipole is orthogonal with the formation boundary in the subterranean formation; and classifying the subterranean formation further comprises classifying the subterranean formation as homogeneous when a difference between the low frequency slowness and the high frequency slowness of the YY measurement is less than a threshold and heterogeneous when the difference is greater than the threshold.

17. The method of claim 14, wherein sequentially transmitting the plurality of dipole waveforms from the acoustic transmitter further comprises:

firing the acoustic transmitter for a plurality of transmitter firings while the logging tool rotates in the wellbore to generate a corresponding plurality of dipole waveforms;

receiving the plurality of dipole waveforms at a directional receiver including a plurality of circumferentially spaced receiver arrays; and measuring a toolface angle corresponding to each of the plurality of transmitter firings.

* * * * *